(12) United States Patent
Dimitrova et al.

(10) Patent No.: US 8,261,306 B2
(45) Date of Patent: Sep. 4, 2012

(54) SYSTEM FOR AND METHOD OF SHOPPING THROUGH TELEVISION

(75) Inventors: Nevenka Dimitrova, Yorktown Heights, NY (US); John D. Zimmerman, Ossining, NY (US); Radu Serban Jasinschi, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1433 days.

(21) Appl. No.: 10/014,258

(22) Filed: Dec. 11, 2001

(65) Prior Publication Data

US 2003/0110507 A1 Jun. 12, 2003

(51) Int. Cl.
*G06F 3/00* (2006.01)
(52) U.S. Cl. ........................................... 725/60; 725/32
(58) Field of Classification Search ................... 725/60, 725/42, 32–36
See application file for complete search history.

(56) References Cited

U.S. PATENT DOCUMENTS

| | | | |
|---|---|---|---|
| 5,870,754 A | 2/1999 | Dimitrova et al. | |
| 5,900,905 A | 5/1999 | Shoff et al. | |
| 5,929,849 A | 7/1999 | Kikinis | 345/327 |
| 6,085,176 A | 7/2000 | Woolston | |
| 6,119,101 A | 9/2000 | Peckover | |
| 6,125,229 A | 9/2000 | Dimitrova et al. | |
| 6,137,544 A | 10/2000 | Dimitrova et al. | |
| 6,185,363 B1 | 2/2001 | Dimitrova et al. | |
| 6,195,497 B1 * | 2/2001 | Nagasaka et al. | 386/46 |
| 6,553,347 B1 * | 4/2003 | Tavor et al. | 705/14 |
| 6,615,408 B1 * | 9/2003 | Kaiser et al. | 725/112 |
| 6,668,278 B1 * | 12/2003 | Yen et al. | 709/218 |
| 7,000,242 B1 * | 2/2006 | Haber | 725/43 |
| 7,127,416 B1 * | 10/2006 | Tenorio | 705/26 |
| 2002/0026386 A1 * | 2/2002 | Walden | 705/27 |
| 2002/0056109 A1 * | 5/2002 | Tomsen | 725/60 |
| 2002/0059590 A1 * | 5/2002 | Kitsukawa et al. | 725/36 |
| 2002/0083469 A1 * | 6/2002 | Jeannin et al. | 725/135 |
| 2002/0104086 A1 * | 8/2002 | Tomsen et al. | 725/42 |
| 2002/0120935 A1 * | 8/2002 | Huber et al. | 725/60 |
| 2002/0128999 A1 * | 9/2002 | Fuisz | 707/1 |
| 2003/0056219 A1 * | 3/2003 | Reichardt et al. | 725/60 |
| 2003/0130983 A1 * | 7/2003 | Rebane | 707/1 |
| 2003/0195877 A1 * | 10/2003 | Ford et al. | 707/3 |
| 2005/0015815 A1 * | 1/2005 | Shoff et al. | 725/135 |
| 2005/0273808 A1 * | 12/2005 | Zeidman | 725/32 |
| 2008/0066129 A1 * | 3/2008 | Katcher et al. | 725/109 |

FOREIGN PATENT DOCUMENTS

EP 1146466 A1 10/2001

(Continued)

*Primary Examiner* — Farzana Hossain

(57) ABSTRACT

A system and method for providing information to television viewers in order to assist them in shopping from an apparently conventional media, such as a television program, as well as making better and more educated shopping decisions are provided. The user selects the product of interest, and if desired, indicates the price, quantity and time frame within which he/she wants to buy the product. The system then acts as an agent on the user's behalf to get the best product under best price and shortest time frame as may be desired. When a user sees a product he wants while watching television, he simply can press a point on the screen, talk, or press a button on a remote control or similar keypad and the system shows the current price and availability. If the user wants the product, he can buy it instantly. If the user determines it to be too expensive, he can add the product to his wish-list with a price he would be willing to pay.

32 Claims, 2 Drawing Sheets

FOREIGN PATENT DOCUMENTS

| WO | WO0116665 | 3/2001 |
| --- | --- | --- |
| WO | WO0119085 | 3/2001 |
| WO | WO0120491 | 3/2001 |
| WO | WO0133464 | 5/2001 |
| WO | WO0167297 | 9/2001 |
| WO | WO0172040 | 9/2001 |

* cited by examiner

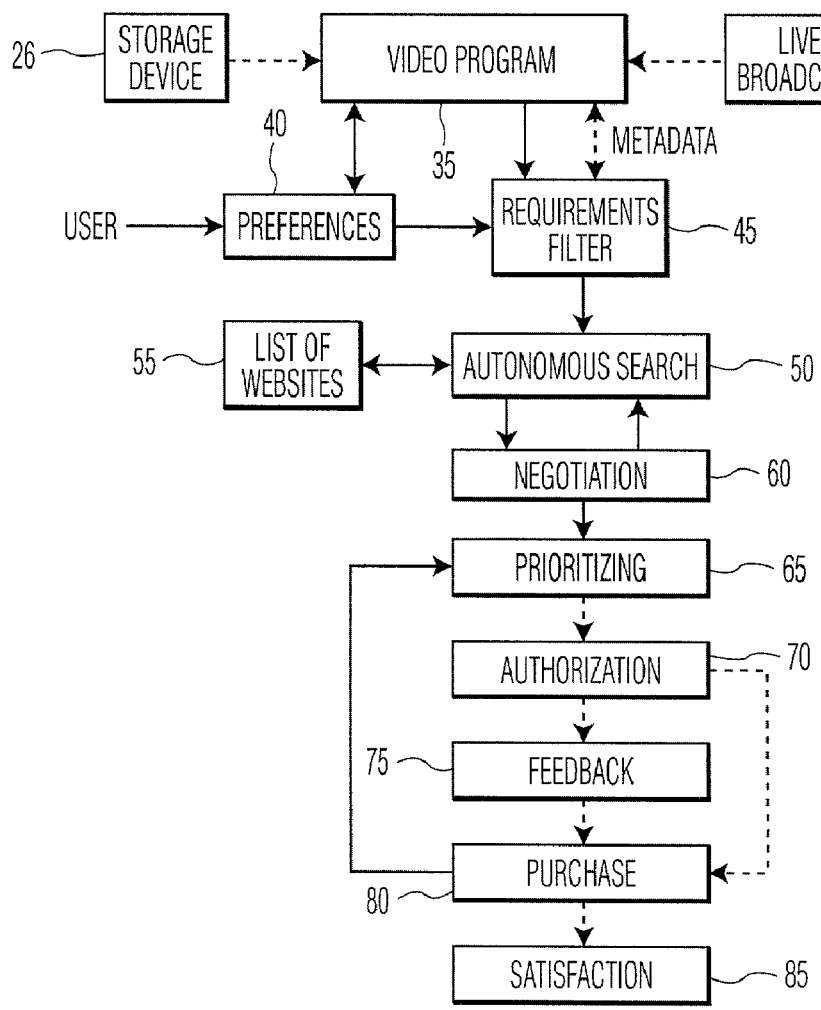
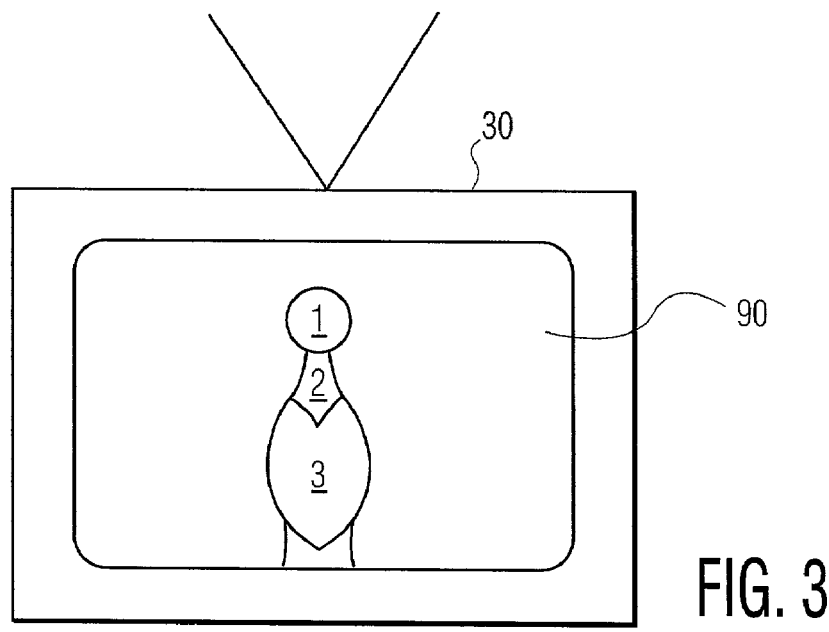
FIG. 2
FIG. 3

SYSTEM FOR AND METHOD OF SHOPPING THROUGH TELEVISION

FIELD OF THE INVENTION

The present invention relates to information-providing services, and more particularly, a method and system for television based personal agents.

BACKGROUND OF THE INVENTION

Today's marketplace presents many disadvantages that lead to consumer frustration. While consumers may have many ways to gather information about available goods and services, such as visiting stores, browsing the World Wide Web, browsing catalogs, viewing advertisements on television, in magazines and newspapers, and others, such collection of basic information about available goods and services, their features and their prices may be tedious and time-consuming. To find a particular product or verify its price, the consumer typically may need to visit several stores across a wide area. Another consumer may choose to browse the World Wide Web in search of the product, perhaps incurring various communication charges for being online if dial-up modem is used, or aimlessly navigating through hundreds of web sites all of which may point to the same product in the same online store. Yet another consumer may choose to spend hours on the telephone navigating irritating automated attendants, trying to reach a human who can answer questions. This process wastes the consumer's valuable time, especially when the search fails. Moreover, information is not always available when it is needed. When a consumer has an immediate need for product or service information, it may be nearly impossible to gather the information quickly, especially when the consumer does not know where to look for the information.

With the advent of the Internet, a new avenue for commerce has been opened—"electronic commerce". An electronic marketplace, just like a traditional marketplace, must support the basic process of commerce wherein offers to sell or buy are made, offers are accepted, and considerations are paid. A viable marketplace must also address side-effects of commerce such as issues of security, privacy, and confidence or trust; otherwise, even if the basic process works, consumers and providers will not feel comfortable enough to participate in the marketplace.

A practical and viable electronic marketplace involves the exchange of market information, as well as the more obvious trading for goods and services. From a consumer's point of view, shopping is a means of gathering data about goods and services offered. This data is used by the consumer to compare and rank offerings and to make decisions about purchases. From a provider's point of view, consumer shopping is an opportunity to gather data about consumer needs and interests. This data is used by the provider to improve product and service offerings.

To accommodate both, consumers and providers, an electronic marketplace introduced new information providing services which overcome some of the deficiencies in electronic commerce. One of the innovations was the electronic shopping agent.

A typical online shopping agent's objective is to assist shoppers in making the best possible buying decisions. Particularly, an objective of such agent-based technology is to put an end to manual searches and site-hopping, and instead, automate the collection of information, including pricing, feature sets, and more from various sites across the World Wide Web, thereby making comparative shopping easy and efficient for users. For example, one of the most utilized features of a typical shopping agent is notifying a user of lower online prices when the user browses supported shopping sites.

Even with the colossal potential of the Internet, current online shopping agents still present various disadvantages to a consumer, thus frustrating the establishment of a viable virtual marketplace. For example, the current online agents simply act as advanced versions of a typical search engine, where the improvement concept is searching within various shopping sites and looking for the best deal. The agents are one-dimensional as they are limited to the search of only one particular product and limited to the databases of only participating online stores. Current online shopping agents lack the functionality of recommending to the consumer based on his/her preferences other products which are similar to the one requested.

Moreover, only Internet users can benefit from the current online shopping agents which only look within the World Wide Web. This leaves the other share of the marketplace, the non-computer consumers, unexplored. A television viewer, for example, while watching the latest episode of a television program, might be interested in acquiring a laptop used by one of the program's characters. There are currently no available means for obtaining information about that particular laptop, let alone obtaining such information readily. The only possible solution would be to note the brand of the computer, which in itself sometimes would be difficult or impossible, go onto the Internet or other research tool and search for that particular laptop. In addition to wasting valuable time, this may lead to thousands of hits which would frustrate the consumer even more.

Television shopping channels provide a consumer with an option to shop while watching television. However, these programs are separate from other conventional programs showing narrative content such as dramas, situation comedies, movies, etc.

In addition, while data casting systems may already exist, i.e. video stream with embedded information for interactive use, the broadcaster is the party preparing the content and inserting the information, thus acting on behalf of the seller or advertiser and not on behalf of a consumer.

Although interactive television systems already exist in today's marketplace, i.e. through the use of set-top boxes, the commerce side of interactive television has not been fully explored yet. The term "set-top box" describes a specialized computer which translates incoming digital signals into a form suitable for viewing on a standard television set. The source of the signals could be a digital satellite or terrestrial broadcast, a cable television connection, or a video-on-demand program which is typically requested across a phone line. Other uses for the set-top box may include control of interactive viewing, for example with a home-shopping channel or WebTV™; the set-top box may also decrypt signals on subscription or pay-per-view channels.

The new set-top boxes may utilize Philips Semiconductors' Trimedia™ VLIW (very long instruction word) multimedia processor, a powerful single-chip multimedia platform, to integrate email, video telephony and Internet browsing technology for use with in-home digital television. With the advancement in television technology, entertainment, information and media delivery channels are increasing in number and changing their original purpose.

In the traditional broadcast model of TV viewing, the TV is tuned to a channel and the user consumes or views the program, as well as the paid advertising or commercials, from that channel. This is known as the "push" model where the content is packaged, predetermined and delivered practically unaltered throughout the delivery chain. Internet, on the other hand, enables a different type of delivery wherein vast quantities of information are at the user's disposal. Contrary to the broadcast model, the user has to actively reach for the information to consume it. This is the "pull" model where content is available at various locations and presentation formats. The user has to locate the content and consume some or all of it.

Both models provide means to help user's navigation or to attract their attention. Broadcast content is advertised (e.g. TV guide) and adapted to be in line with specific (targeted) user groups, but have not offered mechanisms for customization beyond choice of viewing. Internet services offer customization mechanisms through which the user can state a set of preferences according to which content is filtered and presented.

SUMMARY OF THE INVENTION

It is, therefore, an object of the present invention to provide a system and method for providing information to television viewers in order to assist them in shopping from an apparently conventional media, such as a television program, as well as making better and more educated shopping decisions.

Every item or product, including services, in the video stream is either tagged with metadata information or the information about the product/item is automatically extracted for product that is sellable. The user selects the product of interest, and if desired, indicates the price, quantity and time frame within which he/she wants to buy the product. The smart television shopper device then acts as an agent on the user's behalf to get the best product under best price and shortest time frame as may be desired. When a user sees a product he wants while watching television, he simply can press a point on the screen, talk, or press a button on a remote control or similar keypad and the system shows the current price and availability. If the user wants the product, he can buy it instantly. If the user determines it to be too expensive, he can add the product to his wish-list with a price he would be willing to pay.

In addition to selecting and purchasing a product of interest, the system can perform any or all of the following: 1) quote a comparative price based on a pool of related products; 2) display multimedia information related to elements comparative price quoting; 3) link the augmented multimedia content to Internet sites or specialized databases; 4) filter the extracted information back to the user based on the knowledge of user's personal preferences.

In one aspect, a method of obtaining information through a television environment is provided, the method comprising the steps of: acquiring a video signal containing a video program; customizing preferences for at least one user; extracting from the video signal video enhanced content information representative of at least one product for sale; filtering the video program based on the preferences; presenting to the user the video enhanced content information; receiving a selection of a product to be purchased; performing a search for a source of the selected product through a predetermined list of websites for a particular category; negotiating with at least one seller regarding user's selection and outputting search results; prioritizing the search results based on predetermined factors; allowing the user to authorize the purchase transaction; providing feedback information to the user; completing a purchase transaction for the selected product; and receiving and analyzing satisfaction response from the user. The method may further comprise the step of making a personalized catalog for the user.

In another aspect, a system for obtaining information through a television environment is provided, the system comprising: a set-top box for acquiring a video signal containing a video program, the set-top box comprising a memory, processor and input/output means for transferring the signal; the processor being capable of: storing the preferences in the memory, extracting from the video signal video enhanced content information representative of at least one product for sale; presenting to the user the video enhanced content information; receiving a selection of a product to be purchased; performing a search for a source of the selected product; and completing a purchase transaction for the selected product; a television set operatively coupled to the set-top box for displaying video information to the user; an input device operatively associated with the set-top box, for controlling the set-top box and the television. The set top box can also include a storage means such as a hard drive for storing a video signal thus enabling the smart shopper device to function in a recorded state and not only in a live mode.

The above, as well as further features of the invention and advantages thereof, will be apparent in the following detailed description of certain advantageous embodiments which is to be read in connection with the accompanying drawings forming a part hereof, and wherein corresponding parts and components are identified by the same reference numerals in the several views of the drawings.

BRIEF DESCRIPTION OF THE DRAWINGS

Embodiments of the invention will now be described by way of example with reference to the following figures in which:

FIG. 2 is a flow chart illustrating a method in accordance with one embodiment of the present invention.

FIG. 3 is a schematic diagram illustrating a regional division within a frame in accordance with one representative embodiment of the present invention.

DETAILED DESCRIPTION OF THE PREFERRED EMBODIMENT(S)

Figure 1:
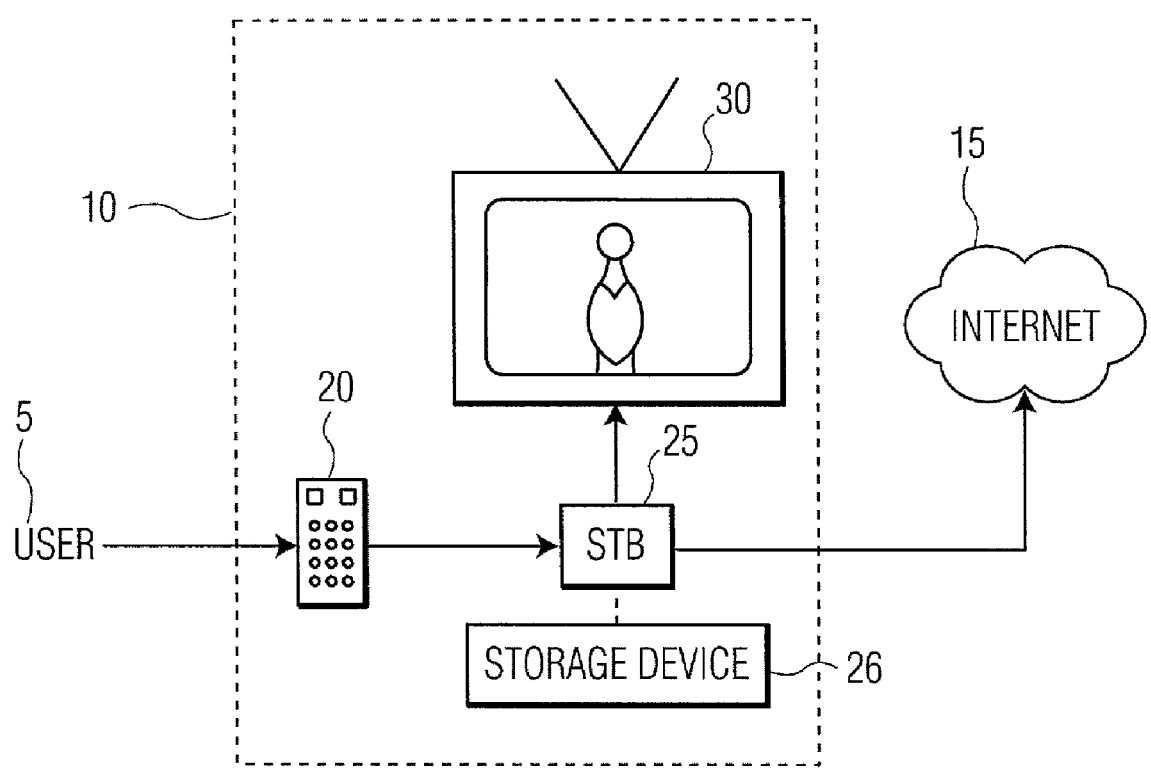
FIG. 1 is a schematic diagram illustrating a system in accordance with one representative embodiment of the present invention.

According to a preferred embodiment of the present invention as illustrated in FIG. 1, a system 10 is provided for presenting user 5 with various customized information and services to enable a user to shop from an apparently conventional media, such as a television program, and to make better and more informed shopping decisions. The system 10 typically comprises an input device, such as a keypad or a remote control 20, operable by the user 5, a set-top box 25 and a television set 30. Alternatively, the system 10 may represent a desktop, laptop or palmtop computer, a personal digital assistant (PDA), as well as portions or combinations of these and other devices capable of receiving, processing and displaying a video signal. The system or the components within the system typically include one or more video sources, one or more input/output devices, a processor and a memory. The input/output devices, processor and memory communicate over a communication medium which may represent a bus, a communication network, one or more internal connections of a circuit, circuit card or other device, as well as portions and combinations of these and other communication media.

Input video, containing a video program, is processed in accordance with one or more programs stored and executed by a processor within the set-top box 25 in order to generate output video. The output video is supplied to a display device, which may be a television set 30, or a computer monitor. Alternatively, the output video can be linked to a network of computers or can transmit the signal to various multimedia components such as DVD, VCR, Video-CD and others. The input video may come from various sources representing one or more network connections for receiving video from a server or servers over a global computer communications network such as the Internet, a wide area network, a metropolitan area network, a local area network, a terrestrial broadcast system, a cable network, a satellite network or a telephone network, as well as portions or combinations of these and other types of networks or systems. As such, in accordance with the preferred embodiment of the present invention, the video program generally may come from any of four alternative sources: broadcaster, content creator, service provider, or from the local set-top box 25, wherein the video program has been stored, although other such sources may be possible.

The set-top-box 25 may include a storage device 26, such as a hard drive for storing a video signal for later non-live viewing. This will enable the smart shopper system to operate in a recorded state as opposed to live state. For example, the viewer can search through recorded content as opposed to live content. Alternatively, the storage device may be a part of a separate hardware.

The system 10, preferably, is connected to the Internet 15 through the set-top box 25. Alternatively, the set-top box 25 and the television 30 can be parts of one unit. Consequently, the system 10 can be connected to the Internet 15 through the television 30. The connection can be wireless or through the use of network cables.

It should be understood that the particular configuration of system 10 as shown in FIG. 1 is by way of example only. In other embodiments of the invention, for example, system 10 is configured for multiple users.

The present invention provides a system and a method for enabling and assisting consumers in shopping through a television. A representative embodiment of the invention is illustrated in FIG. 2 for purpose of example and not limitation.

Generally, every item or service in the video, audio and transcript stream is either tagged with metadata information or the information about the product/item is automatically extracted for product that is sellable. Users can indicate or select products of interest through the user interface using pointing, gesture, speech, and/or a remote control 20. For example, the user 5 can point to a necklace worn by an actress in a movie. The user instantly sees the price if this information is available through the utilization of metadata provided by a broadcaster or content provider, as described below. Otherwise, the user can indicate a price he/she might be willing to pay and wait for the system to find a price for this or a similar product. Adding such metatags (metadata) and selection techniques is well known in the art.

Moreover, a user can indicate the type of information he/she wants to see. For example, he/she can ask for all items found that are similar to the requested item or simply request to see the lowest priced. According to one embodiment of the present invention, the user can authorize the system to just buy the item without further questions and interaction.

System 10 is a smart television shopper device, which is a content augmentation device that inherits from the content augmentation system the modules for automatic triggers and pulling information from the World Wide Web (web) or similar electronic sources. Content augmentation involves automatic (or manual) extraction of content and association (linking) of additional information from other (possibly external sources). For example, automatic triggers including transcript triggers and pulling information from the World Wide Web with systems such as Video Retriever Genie and Dejavideo are well known in the art. Video Retriever Genie is disclosed in: (1) the U.S. patent application Ser. No. 09/818,303 filed Mar. 27, 2001, and entitled AUTOMATIC VIDEO RETRIEVER GENIE, and (2) the U.S. patent application Ser. No. 09/532,845 filed Mar. 21, 2000, and entitled SYSTEM AND METHOD FOR AUTOMATIC CONTENT ENHANCEMENT OF MULTIMEDIA OUTPUT DEVICE, both assigned to the assignee of the present invention and incorporated by reference herein. Dejavideo is disclosed in the U.S. patent application Ser. No. 09/351,086 filed Jul. 9, 1999, and entitled METHOD AND APPARATUS FOR LINKING A VIDEO SEGMENT TO ANOTHER VIDEO SEGMENT OR INFORMATION SOURCE and assigned to the assignee of the present invention and incorporated by reference herein.

The system monitors television, radio, the web, and other suitable media, constantly checking the prices of wish-listed items. When a desired price point is met for a product of interest, the system can either inform the user or, if given permission, the system can even purchase the product automatically.

Furthermore, the smart shopper is a content augmentation system that incorporates an agent working on the consumer's behalf. Agent can be a software based search engine which can be adopted to the user's preferences. The agent performs wide-scale Web searching and also negotiation once the product/price has been located.

Each product, including items or services in the video stream of the video program 35 preferably has associated metadata so that when the user selects an object, associated information is retrieved. Metadata describes the parts of content that can be enhanced. There are different modes of content enhancements requiring different types of metadata: interactive, personal content, and alerts. One type of content enhancement can be envisioned as answering the "w" informative questions about the product: what is the product, where can the product be bought, which is the identical product, when did (and how long will) the product go on sale, or why is it sold. To answer these questions, the metadata types generally would need to include the product's name, seller location, time period information about the product and other useful facts about the product which would make the user's shopping decisions easier and more educated.

Another type of content enhancement would use the metadata to create information related to the viewer's shopping interests or habits. Information, such as recommendations of particular products or listings of similar products which complement already purchased products by the user, is presented in addition to the content. Some metadata types required to do this would be the viewer's occupation and address, history of previously purchased products by the user and others, clothing size, favorite colors, etc.

A third type of content enhancement would be used to alert the viewer of some event related to shopping or the product of interest. This event could be an alert of a certain sale on a product which interests the viewer, or just availability of information on a product. The viewer would be automatically notified of the alert. The type of notification can be dependent on the importance and type of alert. For example, if it is a one-day sale alert on an international flight, the current video program can be immediately interrupted with the alert. However, if the metadata indicates that it is simply an "availability of product/information" alert, then the viewer can be notified on a later occasion through e-mail, letter or other means of information exchange. In this situation, metadata could include keywords such as 'sale', 'new product', 'price drop', that can trigger a message to the user.

The metadata required in the types of content enhancement described above can come from a variety of sources. The metadata can be datacast along with the broadcast. An alternative is that the data can be stored on a remote server (a Web site) or on a local storage device at home such as the set-top box 25 or home media server. In addition, a local client device can discern and extract metadata from the broadcast automatically. Manually inserted metadata is either created during content production or generated at the head-end at broadcast time by content distributors. This requires that the content producers, broadcasters or third party sources generate and supply the metadata. The metadata description format standards such as MPEG-7 or TV Anytime are well known to those skilled in the art.

An alternative to using manually derived metadata is automatic extraction of metadata. Content processing serves the purpose of extracting description of the multimedia information in the video, audio and transcript domains automatically. One efficient source for locally generated content information is transcript information, which can be generated using closed captioning data, teletext, or speech-to-text software. In addition, the transcript data includes videotext that is converted to the text using OCR (Optical Character Recognition). The transcript is then searched to extract keywords that match the viewer's profile and perform content enhancement.

Content processing techniques are well known in the art. For example, content processing on a video signal can be performed in the visual, audio and transcript domain. The video stream is separated into visual, audio and the transcript streams; the latter is created from the extracted closed caption data, speech-to-text, OCR of Videotext, and extraction of teletext. In the visual domain, content processing includes detection of specific frames (via either scene change detection or color analysis), videotext, faces, and motion (including both object and trajectory detection, as well as camera operation). Audio content processing analyzes and segments the audio signal and generates audio categories that include silence, speech, music, noise, and speech with background music, speech and noise. For the transcript stream, the system looks for specific cues for detecting paragraphs in the text and generates segments indicating the category of a segment (e.g. "economy", "movie"). In addition, classification of detected segments is performed based on multiple features from all the three domains. Content processing also includes object identification. Object identification can also use fusion strategies to detect specific objects more reliably. For example, product identification can use a combination of color analysis, edge detection and speech recognition if a person in the video describes the product of interest.

Each video frame (or audio frame) within the video program can be content enhanced. For example, each frame can be subdivided into "regions" based on product types within each region as illustrated in FIG. 3. The content producer can customize each region if desired. For example, region 3 items can be the only ones for sale in frame 90. Furthermore, user statistics can be collected through the utilization of region division. For example, user might be interested in region 2 items, which are not available for sale in frame 90. The system would record the request and look to another frame where region 2 items are available.

The items for sale in a frame can also be marked, so the user knows that these are available. The system can use a variety of interfaces, including pausing a scene and letting the user select certain objects or enabling a picture-in-picture mode where on one picture the user can scroll through the available items and in the other a video is displayed with marked objects.

The content enhanced video program 35 is received by the set-top box 25 which can contain a processor and a memory for processing the video. The set-top box 25 typically has an input device such as a keypad, or preferably a remote control 20 wirelessly communicating with it. User 5 may choose to customize his/her personal settings within the system in order for the system to better meet his/her shopping needs. This may be achieved by setting up personal preferences 40 in the memory of the set-top box 25. The preferences may include items such as the user's sizes, colors he/she prefers, items of interest, price range and other criteria. Alternatively, or additionally, the preferences may be learned over time by the system through consistent use. Such learning algorithms are well known to those skilled in the art.

Users also can specify a variety of parameters in a requirements filter 45. For purpose of illustration, and not limitation, the user can specify any of the following: a minimum price; a price range—the lowest to highest based on features; color; size; level of interest—curious to must-have; timeframe—now as opposed to 24-48 hours or after the next paycheck.

The requirements filter 45 can be configured for each individual video program or each individual user, thus the filter will comprise an array of filters, configured for particular video program or user.

An autonomous search 50 from a variety of information sources is performed after the user selects a certain product. The search takes into consideration the preferences 40 and passes through the requirements filter 45.

If the system can only find a product of interest having a price that is higher than the highest acceptable price entered by the user, the system can generate a report or a survey of what are the possible prices with pictures, audio and video, i.e. making a personalized catalog. Users can also request that the system show mini-catalog compilations instead of commercial breaks when watching television.

Based on previous shopping history the system also can make recommendations, such as mix and match products of interest. For example, if a red necklace was requested, but only a purple was found by the system, the purple necklace will be suggested because it matches a gray suit previously purchased by the user. In addition, the system can learn which vendors the user prefers to deal with by either asking for actual input, or by observing prior purchase behavior. Furthermore, at the time the shopping information comes back, the system can alert the user if there are sales that are about to expire.

The autonomous search 50 can perform the search by utilizing a list of websites which are categorized according to the source. For example, at least three such groups of websites can exist: user's custom list, advertiser's list based on metadata provided by the advertisers, and a system generated list which could be based on the user's shopping habits. The list of websites can be stored either locally within the set-top box in the memory, or in a content provider's system. The list can be periodically updated through the Internet by setting up a software robot which would visit these websites and provide updates on their status.

The user also can set "triggers"; for example, he/she can request to be informed when a selected product of interest is on sale. Furthermore, if user allows his/her system to request coupons, the system of the present invention can let specific vendors know that the user is interested in receiving automatic coupons for certain products.

When the results from the autonomous search are obtained, it is possible that there could be too many hits. The system could then further filter the extracted information back to the user based on the acquired knowledge of user's personal preferences, values and life style. For example, the system's autonomous search for a particular food product may be limited to organic food web sites if the user prefers health food or is interested in ecological issues.

Once the autonomous search is complete and the desired results obtained, the system can perform a negotiation step 60 in accordance with the present invention. In negotiation step 60, the system communicates with the stores/vendors and extracts all the product information necessary for the user. The information extracted may depend on the user's preferences 40. In the negotiation phase, the user may be willing to sell his/her preferences to a store, thus getting some sort of a discount on the items selected. The negotiation stage may also involve users inserting their own price that they are willing to pay for a product selected and asking the stores whether they will accept the price. Such communication can occur over any conventional communication line, and can be performed automatically or prompted for user interaction.

The extracted information gets prioritized in step 65 based on user's preferences, product availability, price and other factors. If the system is not set up to automatically purchase requested products based on preferences, the user might go through an authorization stage 70, where he/she will either accept or reject the proposed product(s) for purchase. If the system is set up for automatic purchase, a feedback mechanism 75 would alert the users of the purchase or suggest similar products if the requested products are not available. If the user is not available, the system can call, e-mail or use other means of communication to inform the user of requested information or action.

A secure purchase transaction 80 is performed either immediately or later upon user's authorization through the system. The item, time, price, site location are all recorded in user's history so that they can be used later for customization of user's preferences. An electronic receipt can be generated and e-mailed to the user or sent by mail.

The user may choose to fill out a satisfaction form 85, which will let the system know whether this particular site should be used for future purchases.

While the invention has been described in connection with preferred embodiments, it will be understood that modifications thereof within the principles outlined above will be evident to those skilled in the art and thus, the invention is not limited to the preferred embodiments, but is intended to encompass such modifications.

What is claimed is:

1. A method of performing a transaction using a video device, the method comprising acts of:
    displaying a video signal including a video program separated into a plurality of frames, at least a first of the plurality of frames having one or more selectable regions associated with one or more products having enhanced content included in one or more of the plurality of frames subsequent to the first frame;
    selecting a first selectable region corresponding to a product of interest from the one or more selectable regions of the first frame of the plurality of frames;
    extracting enhanced content representative of the product of interest from the first frame when the enhanced content is available in the first frame, and when the enhanced content is not available in the first frame, from at least one other of the plurality of frames subsequent to the first frame;
    identifying data related to the selected product of interest; and
    providing the enhanced content and data of the selected product of interest to a user of the video device.

2. The method of claim 1, wherein said video signal includes metadata.

3. The method of claim 1, further comprising an act of purchasing the selected product.

4. The method of claim 1, further comprising an act of filtering the enhanced content based on preferences customized by at least one user.

5. The method of claim 4, wherein said preferences include values and life style of the user.

6. The method of claim 1, wherein the enhanced content of the selected product of interest includes a source of the product of interest, the method further comprising acts of offering the product source a price the user is willing to pay to buy the product of interest other than a price initially requested by the product source; and displaying acceptance or rejection of the offer.

7. The method of claim 6, wherein the source is a user's custom list.

8. The method of claim 6, wherein the source is a video device generated list based on a shopping habit of the user.

9. The method of claim 1, wherein the identifying act comprises an act of searching product sources from at least one predetermined list for a particular category of products.

10. The method of claim 1, wherein the video signal is acquired from at least one video signal source selected from a group consisting of a broadcasting system, a content creator, a service provider, and a set-top box.

11. The method of claim 9, further comprising an act of prioritizing results of the search based on availability.

12. The method of claim 1, further comprising acts of receiving and analyzing transaction related information from the user.

13. The method of claim 1, further comprising acts of periodically monitoring said enhanced content and triggering an action based on user's requests or preferences.

14. The method of claim 1, further comprising an act of making a personalized catalog of products for the user.

15. A system for performing a transaction using a video device, said system comprising:
    a set-top box;
    a video device operatively coupled to the set-top box for displaying a video signal including a video program separated into a plurality of frames, at least a first of the plurality of frames having one or more selectable regions associated with one of one or more products having enhanced content included in one or more of the plurality of frames subsequent to the first frame, said set-top box including a memory, a processor and an input/output associated therewith for transferring the video signal, the processor being configured for
    selecting a first selectable region corresponding to a product of interest from the one or more selectable regions of the first frame of the plurality of frames;
    extracting enhanced content representative of the product of interest from the first frame when the enhanced content is available in the first frame, and when the enhanced content is not available in the first frame, from at least one other of the plurality of frames subsequent to the first frame;

identifying data related to the selected product of interest; and providing the enhanced content and data of the selected product of interest to the video device; and an input device operatively associated with said set-top box for controlling said set-top box.

16. The system of claim 15, wherein said video signal includes metadata.

17. The system of claim 15, wherein the processor is further configured for purchasing the selected product.

18. The system of claim 15, wherein the processor is further configured for filtering the enhanced content based on stored preferences customized by at least one user.

19. The system of claim 18, wherein said preferences include values and life style of the user.

20. The system of claim 15, wherein the enhanced content of the selected product of interest includes a source of the product of interest, the processor further configured for offering the product source a price the user is willing to pay to buy the product of interest other than a price initially requested by the product source; and displaying acceptance or rejection of the offer.

21. The system of claim 20, wherein the source is a user's custom list.

22. The system of claim 20, wherein the source is a video device generated list based on a shopping habit of the user.

23. The system of claim 15, wherein the processor is further configured for retrieving a predetermined list for a particular category of products associated with a particular category of products and accessing the predetermined list to perform the search for identified data related to the selected product of interest.

24. The system of claim 15 further comprising a source for the video signal, the video signal source being selected from a group consisting of a broadcasting system, a content creator, a service provider, and a set-top box.

25. The system of claim 23, wherein the processor is further configured for prioritizing results of the search based on availability.

26. The system of claim 15, wherein the processor is further configured for periodically monitoring said enhanced content and triggering an action based on user's requests or preferences.

27. The system of claim 15, wherein the processor is further configured for making a personalized catalog of products for the user.

28. A method of performing a transaction using a video device, said method comprising acts of:

displaying a video signal including a video program separated into a plurality of frames, at least a first of the plurality of frames having one or more selectable regions associated with one or more products having enhanced content included in one or more of the plurality of frames subsequent to the first frame;

customizing preferences for at least one user;

selecting a first selectable region corresponding to a product of interest from the one or more selectable regions of the first frame of the plurality of frames;

extracting enhanced content representative of the product of interest from the first frame when the enhanced content is available in the first frame, and when the enhanced content is not available in the first frame, from at least one other of the plurality of frames subsequent to the first frame;

filtering the enhanced content based on the preferences;

identifying a source of the selected product of interest through searching at least one predetermined list of information sources for a particular category and the video signal;

offering a product source of the product of interest a price the user is willing to pay to buy the selected product of interest other than a price initially requested by the product source regarding the selected product and displaying acceptance or rejection of the offer;

allowing the user to authorize purchasing of the selected product;

providing feedback information to the user;

completing a purchase transaction for the selected product; and receiving and analyzing a satisfaction response from the user.

29. The method of claim 28, further comprising an act of storing said video signal in a storage device.

30. The method of claim 28, further comprising an act of prioritizing results of the search based on availability.

31. The method of claim 28, wherein the source is a user's custom list.

32. The method of claim 28, wherein the source is a video device generated list based on a shopping habit of the user.

* * * * *